United States Patent [19]
Nakazawa et al.

[11] Patent Number: 5,952,939
[45] Date of Patent: Sep. 14, 1999

[54] VEHICLE COLLISION PREVENTION DEVICE

[75] Inventors: Masao Nakazawa; Sadahiro Takahashi, both of Ageo, Japan

[73] Assignee: Nissan Diesel Co., Ltd., Ageo, Japan

[21] Appl. No.: 08/925,390

[22] Filed: Sep. 8, 1997

Related U.S. Application Data

[63] Continuation of application No. 08/534,461, Sep. 27, 1995, abandoned.

[30] Foreign Application Priority Data

Sep. 27, 1994 [JP] Japan ................................. 6-231497

[51] Int. Cl.⁶ ........................................................ G08G 1/16
[52] U.S. Cl. ........................ 340/903; 180/169; 303/9.69; 340/435; 701/70; 701/301
[58] Field of Search ........................... 340/435, 903; 367/909; 180/167, 169; 303/166, DIG. 2, 9.69, 198; 701/78, 79, 83, 70, 301, 93

[56] References Cited

U.S. PATENT DOCUMENTS

| | | | |
|---|---|---|---|
| 3,977,735 | 8/1976 | Bush et al. | 303/22 R |
| 4,414,630 | 11/1983 | Harris et al. | 303/104 |
| 4,677,557 | 6/1987 | Stumpf | 303/22 R |
| 4,795,219 | 1/1989 | Brearley et al. | 303/9.69 |
| 4,833,469 | 5/1989 | David | 340/903 |
| 5,166,881 | 11/1992 | Akasu | 340/903 |
| 5,355,118 | 10/1994 | Fukuhara | 340/435 |
| 5,420,792 | 5/1995 | Butsuen et al. | 340/903 |
| 5,459,460 | 10/1995 | Nishino | 340/903 |
| 5,474,369 | 12/1995 | Inagaki et al. | 364/426.01 |
| 5,505,532 | 4/1996 | Tozu et al. | 303/198 |
| 5,772,289 | 6/1998 | Nakazawa et al. | 303/9.69 |

*Primary Examiner*—Brent A. Swarthout
*Attorney, Agent, or Firm*—Foley & Lardner

[57] ABSTRACT

A distance and a relative velocity between a vehicle and a vehicle in front are detected, and the minimum braking force required to avert a collision is calculated. A vehicle braking force based on the depression angle of the brake pedal and the minimum vehicle braking force are compared, and the larger of these two forces is applied for braking. Collision of the vehicles is thereby prevented. Preferably, the braking force is distributed to each of wheel brakes according to the dynamic loads acting on each wheel so that braking force is optimized and the wheels do not easily lock. More preferably, an alarm is issued when the vehicle braking force based on the brake pedal depression angle is less than the minimum vehicle braking force so that the driver is alerted to this fact.

3 Claims, 4 Drawing Sheets

VEHICLE COLLISION PREVENTION DEVICE

This application is a continuation of application Ser. No. 08/534,461, filed Sep. 27, 1995, now abandoned.

FIELD OF THE INVENTION

This invention relates to a device for preventing a vehicle collision with a vehicle in front.

BACKGROUND OF THE INVENTION

Tokkai Hei 6-44500 and Tokkai Hei 6-27238 published by the Japanese Patent Office in 1994 disclose a device for preventing vehicle collision by calculating a minimum safe distance according to the vehicle speed, using a laser radar that measures the distance to the vehicle in front and a speed sensor for detecting the speed of the vehicle. When the distance to the vehicle in front falls below this minimum distance, the device warns the driver of the vehicle by means of a sound or vibration.

When the driver recognizes the danger, he has to slow down to avoid a collision.

However, this device merely emits an alarm, and it does not directly relate to the braking operation the driver has to take in response to the alarm.

SUMMARY OF THE INVENTION

It is therefore an object of this invention to control the braking of a vehicle according to an inter-vehicle distance, i.e., a distance between the vehicle and a vehicle ahead, so as to obtain the braking force necessary to prevent collision.

It is a further object of this invention to optimize the distribution of braking force to the wheels of a vehicle when the brake is operated.

In order to achieve the above objects, this invention provides a collision prevention device for a vehicle equipped with a brake system. The device comprises a brake pedal, a mechanism for detecting a depression angle of the pedal, a mechanism for calculating a first braking force according to the depression angle, a mechanism for measuring a distance between the vehicle and another vehicle in front of the vehicle, a mechanism for detecting a velocity of the vehicle relative to the other vehicle, a mechanism for calculating a second braking force required to avoid a collision of the vehicle with the other vehicle from the distance and the relative velocity, and a mechanism for applying the larger value of the first and second braking forces to the brake.

It is preferable that the device further comprises a mechanism for emitting an alarm when the first braking force is less than the second braking force.

This invention also provides a collision prevention device for a vehicle equipped with a plurality of wheels and a plurality of brakes for respectively braking the wheels. The device comprises a brake pedal, a mechanism for detecting a depression angle of the pedal, a mechanism for calculating a first braking force according to the depression angle, a mechanism for measuring a distance between the vehicle and another vehicle in front of the vehicle, a mechanism for detecting a velocity of the vehicle relative to the other vehicle, a mechanism for calculating a minimum braking force required to avoid a collision from the distance and the relative velocity, a mechanism for detecting a dynamic load acting on each of the wheels, a mechanism for distributing the larger value of the first and minimum braking forces to the wheels based on the dynamic loads, and for controlling a brake force of each of the brakes to the distributed braking force.

It is also preferable that the device further comprises a mechanism for emitting an alarm when the first braking force is less than the minimum braking force.

The details as well as other features and advantages of this invention are set forth in the remainder of the specification and are shown in the accompanying drawings.

BRIEF DESCRIPTION OF THE INVENTION

DESCRIPTION OF THE PREFERRED EMBODIMENTS

Figure 1:
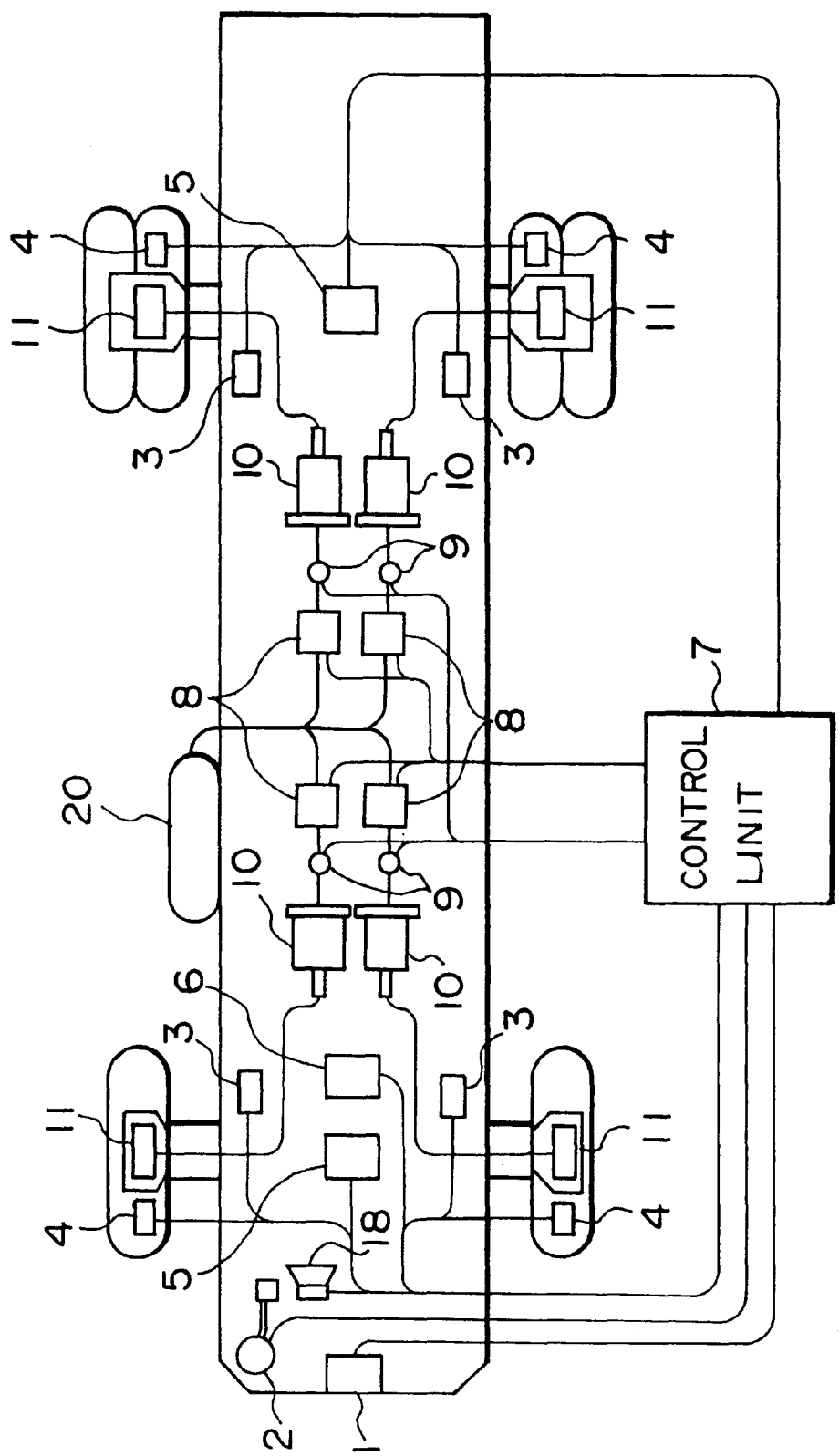
FIG. 1 is a schematic block diagram of an anti-collision device according to this invention.

Referring to FIG. 1 of the drawings, vehicle wheels are each provided with a brake cylinder 11 that receives hydraulic pressure to apply a braking force. Each of the cylinders 11 is connected to a booster 10 by hydraulic piping. The booster 10 is connected to an air reservoir 20 via an electromagnetic valve 8, and supplies an oil pressure directly proportional to the air pressure input via the valve 8. This pressure will hereinafter be referred to as brake air pressure.

The electromagnetic valves 8 control the brake air pressure supplied to each booster 10 from the air reservoir 20 according to a control current input from a control unit 7.

Signals from stroke sensors 3, acceleration sensors 5 and an acceleration sensor 6, a brake pedal depression sensor 2, tire rotation sensors 4, brake air pressure sensors 9, and a laser radar 1 are input to the control unit 7. The stroke sensors 3 respectively detect a stroke length of each suspension supporting the front-right, front-left, rear-right and rear-left wheels. The stroke sensors 3 also function as sensors that detect a static load acting on each wheel from this stroke length. The acceleration sensor 6 detects a forward/backward acceleration of the vehicle. The acceleration sensors 5 detect the sideways acceleration of front and rear axles supporting the front and rear wheels.

The brake pedal depression sensor 2 detects a depression angle of a brake pedal with which the vehicle is equipped. The tire rotation sensors 4 detect a rotation speed of each wheel. The brake air pressure sensors 9 detect the brake air pressure between the electromagnetic valves 8 and boosters 10.

The laser radar 1 measures a distance from the vehicle to a vehicle in front using a laser beam. A laser radar having such a function is known from the prior art.

Figure 4:
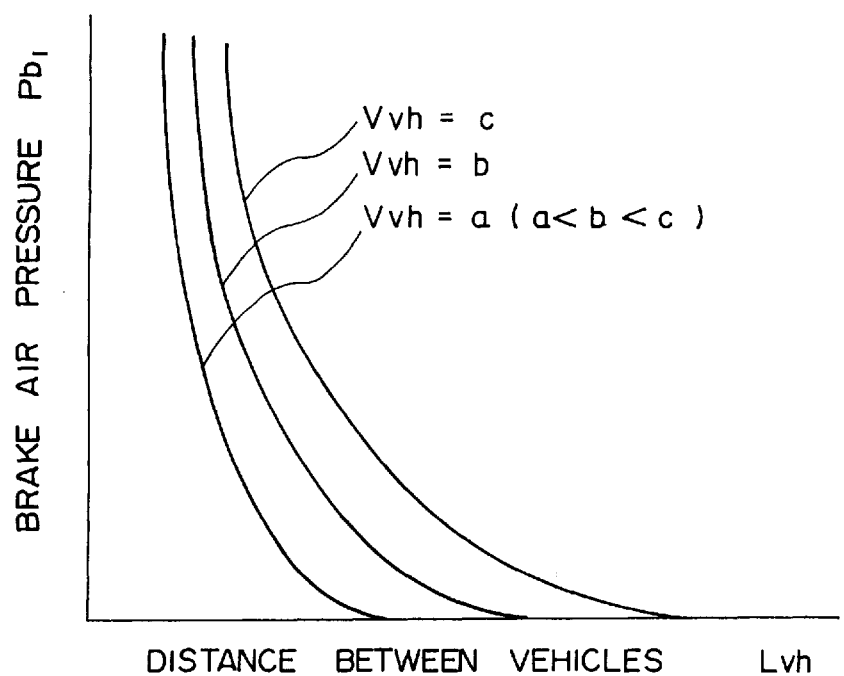
FIG. 4 is a graph showing a relation between inter-vehicle distance and brake air pressure according to this invention.
Figure 5:
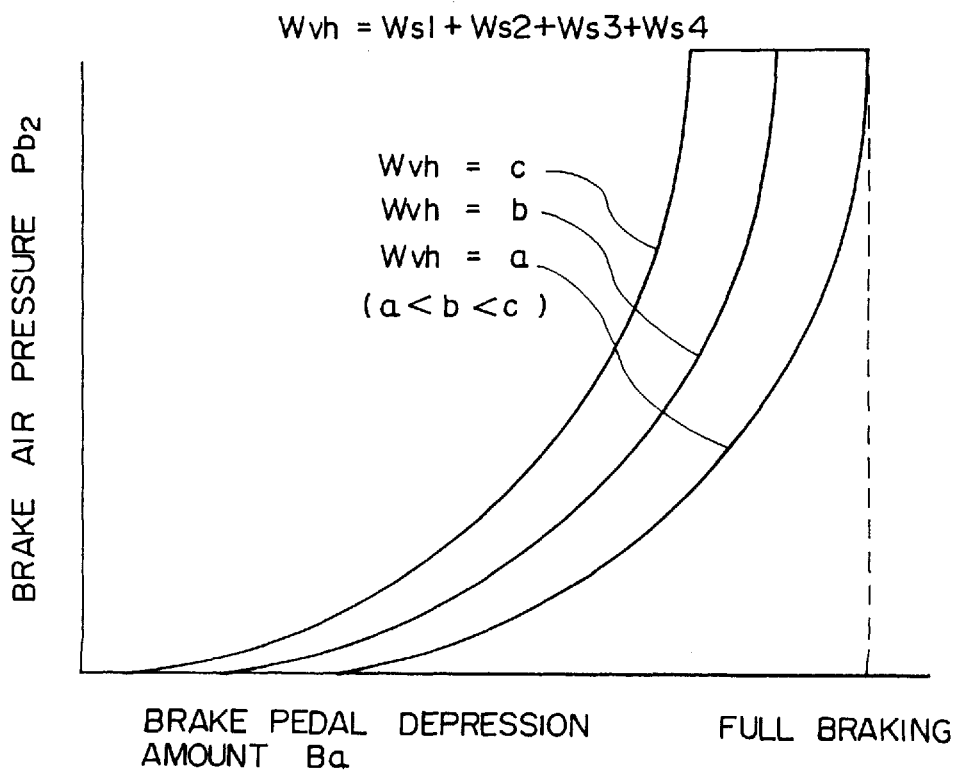
FIG. 5 is a graph showing a relation between brake pedal operation and brake air pressure according to this invention.

The control unit 7 is a microprocessor comprising an input/output circuit, ROM, RAM and CPU. Brake air pressure maps shown in FIGS. 4 and 5 are stored in the ROM. The map of FIG. 4 specifies a minimum brake air pressure $P_{b_1}$ required to avoid a collision, according to the inter-vehicle distance and a velocity of the vehicle relative to the vehicle in front calculated therefrom. The map of FIG. 5 specifies a brake air pressure $P_{b_2}$ based on the brake pedal depression angle and the vehicle weight.

According to the aforesaid input signals, the control unit 7 searches the brake air pressures $P_{b_1}$, $P_{b_2}$ from the maps of FIG. 4 and FIG. 5, and sets the brake air pressure to whichever value is the larger. Further, if the brake air pressure $P_{b_2}$ obtained from the map of FIG. 5 is less than the brake air pressure $P_{b_1}$ obtained from the map of FIG. 4, an alarm signal is output to an alarm 18 fitted on the vehicle.

Figure 2:
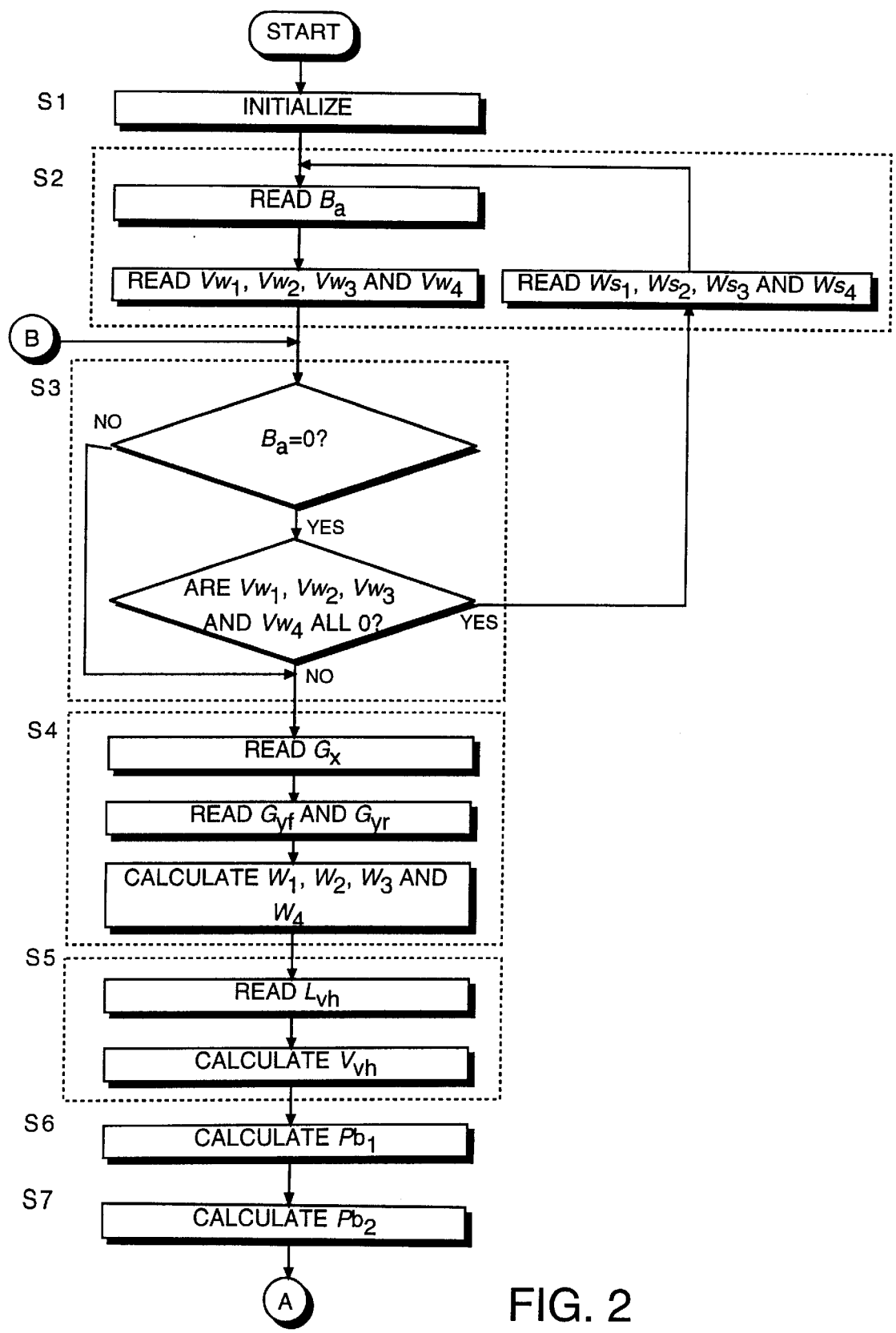
FIG. 2 is a flowchart showing a part of a braking control process according to this invention
Figure 3:
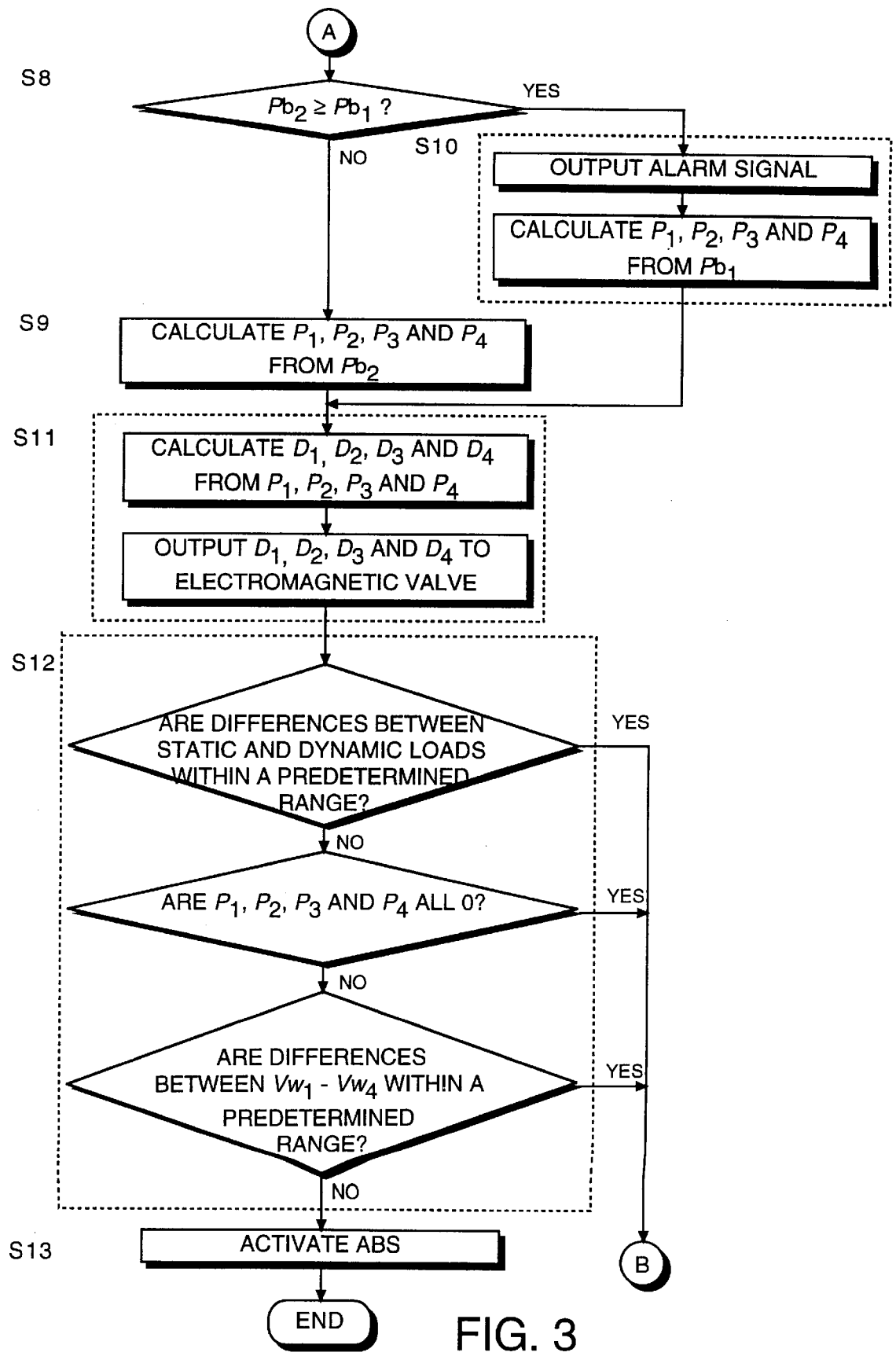
FIG. 3 is a flowchart showing the remaining part of the braking control process.

The above control will now be described with reference to the flowcharts of FIGS. 2 and 3. In a step S1, a predetermined initialization is performed when power is switched ON by an ignition key with which the vehicle is equipped. In a step S2, a brake pedal depression angle $B_a$ is read from the detection signal output by the brake pedal depression sensor 2, and tire rotation speeds $V_{W_1}$–$V_{W_4}$ are read from the detection signals output by the tire rotation sensors 4. Also in a step S3, when it is determined that the brake pedal depression angle $B_a$ is zero and all the tire rotation speeds $V_{W_1}$–$V_{W_4}$ are zero, static loads $W_{S_1}$–$W_{S_4}$ acting on the wheels are read from the detection signals output by the stroke sensors 3.

When the brake pedal depression angle $B_a$ in not zero in the step S3 or when any of the tire rotation speeds $V_{W_1}$–$V_{W_4}$ are not zero even if the brake pedal depression angle $B_a$ is zero, the processing of a step S4 and subsequent steps are performed.

In the step S4, a forward/backward acceleration $G_X$ is read from the detection signal output by the forward/backward acceleration sensor 6, and a sideway acceleration $G_{yf}$ of the front axle and a sideway acceleration $G_{yr}$ of the rear axle are read from the detection signals output by the sideway acceleration sensors 5. Dynamic loads $W_1$–$W_4$ acting on each wheel are then calculated from these values $G_X$, $G_{yf}$, $G_{yr}$ and the static loads acting on each wheel $W_{S_1}$–$W_{S_4}$.

In a step S5, a distance $L_{vh}$ to the vehicle in front is read from the signal output from the laser radar 1, and the relative velocity $V_{vh}$ between the vehicle and the vehicle in front is calculated from the change of the inter-vehicle distance $L_{vh}$ and a time interval of the measurement.

In a step S6, the minimum brake air pressure $P_{b_1}$ required to avoid a collision is found from the map of FIG. 4 according to the inter-vehicle distance $L_{vh}$ and relative velocity $V_{vh}$.

In a step S7, a brake air pressure $P_{b_2}$ required by the driver from the map of FIG. 5 is found according to the brake pedal depression angle $B_a$ and vehicle weight $W_{vh}=(W_{S_1}+W_{S_2}+W_{S_3}+W_{S_4})$.

In a step S8, these brake air pressures $P_{b_1}$ and $P_{b_2}$ are compared, and when $P_{b_2} \geq P_{b_1}$, a brake air pressure $P_1$–$P_4$ is calculated so that $P_{b_2}$ is distributed according to the dynamic loads $W_1$–$W_4$ acting on each wheel in a step S9.

On the other hand when $P_{b_2}<P_{b_1}$, in a step S10, an alarm signal is output to the alarm 18 and a brake air pressure $P_1$–$P_4$ is also calculated so that $P_{b_2}$ is distributed according to the dynamic loads $W_1$–$W_4$.

In both cases, the routine advances to a step S11, control values $D_1$–$D_4$ of current corresponding to the brake air pressures $P_1$–$P_4$ are calculated, and output to the electromagnetic valves 8.

When the brake is operated and at least one of the wheel is locked, a command is issued to operate an antiskid brake system (ABS). The occurrence of the wheel lock is determined in a step S12. In other words, when any of the differences between the static and dynamic loads on the wheels is out of a predetermined range, any of the brake air pressures $P_1$–$P_4$ is not zero and any of the differences between the tire rotation speeds $V_{W_1}$–$V_{W_4}$ is out of a predetermined range, it is determined that one or more of the wheels has locked. In this case, operation of an antiskid brake system is started in a step S13. Such an antiskid brake system is known in the art, and its description will be omitted here.

The calculation of the dynamic loads $W_1$–$W_4$ (step S4) and setting of the brake air pressures $P_1$–$P_4$ so that they are linearly proportional to the dynamic loads (S9 and S10) are both disclosed in the following reference:

A Study of Electronic Brake Distribution Control for Medium Duty Commercial Vehicles, Nakazawa et al, Technical Conference Preprint No. 946, published Sep. 1, 1994 by the Japanese Society of Automobile Engineering.

According to the aforesaid collision prevention device, even when the driver does not take appropriate braking action, the minimum braking force $P_{b_1}$ necessary to prevent a collision is automatically obtained, hence a collision with the vehicle in front is definitively prevented.

The vehicle braking force is assigned to the wheels according to the dynamic load, so that wheel lock does not easily occur even if the vehicle is braked while it is making a turn.

Further, even when the driver's brake pedal depression angle $B_a$ is insufficient, he is alerted to the danger of a collision by the alarm 18. Due to this alarm, the driver learns a safe inter-vehicle distance depending on the vehicle speed, and this helps him to learn a suitable brake pedal depression angle according to the load and running conditions.

According to the aforesaid embodiment, an Air Over Hydraulic (AOH) type brake was used, however this invention may be applied also to a Full Air Type or Hydraulic Type brake.

If sensors having a high detection precision and good response are used for the stroke sensors, and if the dynamic loads on the wheels are read from the sensor detection signals, the forward/backward acceleration sensor 6 and sideways acceleration sensor 5 of the vehicle may be omitted.

The embodiments of this invention in which an exclusive property or privilege is claimed are defined as follows:

1. A vehicle collision preventing device for a vehicle with a plurality of wheels, each of which has a brake, the device comprising:

a brake pedal;

means for detecting a degree of depression of the brake pedal;

means for determining a first braking force based on the degree of pedal depression;

means for measuring a distance between the vehicle and an obstacle in front of the vehicle, the obstacle including another vehicle traveling in front of the vehicle;

means for detecting a traveling speed of the vehicle relative to the obstacle;

means for determining a minimum braking force required to avoid a collision with the obstacle based on the relative vehicle traveling speed and the distance measured;

means for selecting the greater of the first braking force and the minimum braking force;

means for detecting static loads acting on the respective wheels;

means for detecting an acceleration of the vehicle;

means for calculating dynamic loads acting on the respective wheels based on the static loads acting on the respective wheels and the acceleration of the vehicle;

means for calculating actual braking forces to be applied respectively to the wheels based on the selected braking force and the dynamic loads of the wheels; and means for applying the calculated actual brake forces respectively to the brakes.

2. A vehicle collision preventing device according to claim 1, further comprising means for emitting an alarm when the first braking force is less than the minimum braking force.

3. A vehicle collision preventing device according to claim 1, wherein the degree of pedal depression is measured by an angle.

* * * * *